United States Patent
Roytman et al.

(10) Patent No.: US 12,499,221 B2
(45) Date of Patent: Dec. 16, 2025

(54) SYSTEMS AND METHODS FOR GENERATING ATTACK TACTIC PROBABILITIES FOR HISTORICAL TEXT DOCUMENTS

(71) Applicant: Cisco Technology, Inc., San Jose, CA (US)

(72) Inventors: Michael Roytman, Chicago, IL (US); Edward Thayer Bellis, IV, Evanston, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 360 days.

(21) Appl. No.: 17/866,182

(22) Filed: Jul. 15, 2022

(65) Prior Publication Data

US 2023/0315844 A1 Oct. 5, 2023

Related U.S. Application Data

(60) Provisional application No. 63/326,398, filed on Apr. 1, 2022.

(51) Int. Cl.
  *G06F 21/55*  (2013.01)
  *G06F 16/334*  (2025.01)
  *G06F 16/353*  (2025.01)
  *G06N 5/022*  (2023.01)

(52) U.S. Cl.
  CPC ........ *G06F 21/554* (2013.01); *G06F 16/3344* (2019.01); *G06F 16/353* (2019.01); *G06N 5/022* (2013.01); *G06F 2221/031* (2013.01)

(58) Field of Classification Search
  CPC .. G06F 21/554; G06F 16/3344; G06F 16/353; G06F 2221/031; G06N 5/022; G06N 3/08; G06N 20/00
  See application file for complete search history.

(56) References Cited

U.S. PATENT DOCUMENTS

| | | | |
|---|---|---|---|
| 11,290,483 B1 | 3/2022 | Kannan et al. | |
| 2002/0194158 A1* | 12/2002 | Stensmo | G06F 16/3346 |
| 2018/0146000 A1* | 5/2018 | Muddu | G06F 16/9024 |
| 2020/0349430 A1* | 11/2020 | Schmidtler | G06N 3/084 |
| 2020/0358819 A1* | 11/2020 | Bowditch | G06F 17/18 |
| 2021/0203673 A1 | 7/2021 | dos Santos et al. | |

(Continued)

FOREIGN PATENT DOCUMENTS

| | | |
|---|---|---|
| CN | 107368592 B | 9/2020 |
| KR | 20220007395 A | 1/2022 |

OTHER PUBLICATIONS

Office Action for Canadian Application No. 3240333, dated Apr. 24, 2025, 5 Pages.

(Continued)

*Primary Examiner* — Khoi V Le
(74) *Attorney, Agent, or Firm* — Baker Botts L.L.P.

(57) ABSTRACT

In one embodiment, a method includes receiving a historical text document that is associated with a breach event. The method also includes searching for an attack tactic within the historical text document using a machine learning algorithm. The method further includes generating a probability that the attack tactic exists within the historical text document, comparing the probability to a predetermined probability threshold, and categorizing the historical text document based on the probability.

14 Claims, 3 Drawing Sheets

(56) References Cited

U.S. PATENT DOCUMENTS

2021/0367961 A1* 11/2021 Kuppa .................. G06F 40/205
2021/0385138 A1* 12/2021 Watson ............... H04L 47/2441
2022/0053016 A1    2/2022 Trost et al.
2022/0053019 A1    2/2022 Lantuh et al.

OTHER PUBLICATIONS

International Search Report and Written Opinion corresponding to PCT/US2023/015712, dated Jun. 29, 2023, 13 pages.

Ayoade Gbadebo et al., "Automated Threat Report Classification Over Multi-Source Data", 2018 IEEE 4th International Conference on Collaboration and Internet Computing (CIC), IEEE, Oct. 18, 2018 (Oct. 18, 2018), pp. 236-245, XP033450043, DOI: 10.1109/CIC.2018.00040 [retrieved on Nov. 15, 2018] p. 237, left column last paragraph—right column first, second and third paragraph; p. 239 left col. 2) Tactics; Table I; Section V; Fig. 7; Algorithm 1-3; Table II; Table IV.

EMA, IT & Data Management Research, Industry Analysis & Consulting, EMA Impact Brief, "Anomali Platform Meshes World-Class Intelligence with Instantaneous Threat Detection" (downloaded Apr. 29, 2022).

* cited by examiner

SYSTEMS AND METHODS FOR GENERATING ATTACK TACTIC PROBABILITIES FOR HISTORICAL TEXT DOCUMENTS

CROSS-REFERENCE TO RELATED APPLICATIONS

This application claims benefit of U.S. Provisional Patent Application No. 63/326,398 filed Apr. 1, 2022 by Michael Roytman et al., and entitled "RISK BASED XDR USING NLP," which is incorporated herein by reference as if reproduced in its entirety.

TECHNICAL FIELD

The present disclosure relates generally to generating attack tactic probabilities, and more specifically to systems and methods for generating attack tactic probabilities for historical text documents.

BACKGROUND

Cybersecurity is the practice of protecting systems, networks, and/or programs from digital attacks. These cyber-attacks are usually aimed at accessing, changing, and/or destroying sensitive information, extorting money from users, and/or interrupting normal business processes. To effectively implement cybersecurity measures, security operations analysts need to determine whether incidents such as data breach events need to be further investigated. However, this proves challenging due to the high quantity of incidents.

DESCRIPTION OF EXAMPLE EMBODIMENTS

Overview

According to an embodiment, a network component includes one or more processors and one or more computer-readable non-transitory storage media coupled to the one or more processors and including instructions that, when executed by the one or more processors, cause the network component to perform operations. The operations include receiving a historical text document that is associated with a breach event. The operations also include searching for an attack tactic within the historical text document using a machine learning algorithm. The operations further include generating a probability that the attack tactic exists within the historical text document, comparing the probability to a predetermined probability threshold, and categorizing the historical text document based on the probability.

In some embodiments, the operations include training the machine learning algorithm to detect the attack tactic using a plurality of historical text documents previously tagged with the attack tactic. In certain embodiments, the machine learning algorithm uses natural language processing (NLP) to search for the attack tactic within the historical text document. In some embodiments, the historical text document associated with the breach event is one of the following: a data breach news article; a cyber incident document reported to a federal agency; a cyber incident document reported to a state agency; or an industry data breach report.

In certain embodiments, the operations include searching for a financial loss value within the historical text document using a machine learning algorithm. The financial loss value may be associated with the data breach. In some embodiments, the operations include categorizing the historical text document based on the financial loss value.

In certain embodiments, searching for the attack tactic within the historical text document using the machine learning algorithm includes one or more of the following: searching for words associated with the attack tactic; analyzing a predetermined number of words that appear before an identified word associated with the attack tactic; analyzing a predetermined number of words that appear after an identified word associated with the attack tactic; and searching for a number of times a word associated with the attack tactic appears in the historical text document.

In certain embodiments, generating the probability that the attack tactic exists within the historical text document is based on one or more of the following: a number of words associated with the attack tactic that are detected in the historical text document; a number of times a word associated with the attack tactic appears in the historical text document; an analysis of a predetermined number of words that appear before an identified word associated with the attack tactic; and an analysis of a predetermined number of words that appear after an identified word associated with the attack tactic.

According to another embodiment, a method includes receiving a historical text document that is associated with a breach event. The method also includes searching for an attack tactic within the historical text document using a machine learning algorithm. The method further includes generating a probability that the attack tactic exists within the historical text document, comparing the probability to a predetermined probability threshold, and categorizing the historical text document based on the probability.

According to yet another embodiment, one or more computer-readable non-transitory storage media embody instructions that, when executed by a processor, cause the processor to perform operations. The operations include receiving a historical text document that is associated with a breach event. The operations also include searching for an attack tactic within the historical text document using a machine learning algorithm. The operations further include generating a probability that the attack tactic exists within the historical text document, comparing the probability to a predetermined probability threshold, and categorizing the historical text document based on the probability.

Technical advantages of certain embodiments of this disclosure may include one or more of the following. Certain embodiments of this disclosure use machine learning algorithms to categorize historical text documents. The machine learning algorithms allow businesses to handle more data from more sources to increase efficiency. By feeding the machine learning algorithm large quantities of data breach documents, machine learning is able to determine a probability that a historical text document associated with a data breach includes one or more attack tactics, techniques, or a combination thereof. With the understanding that certain entities may not have the ability to remediate all identified security incidents, this disclosure assists security operations teams in sifting through the noise to focus on the historical text documents that pose immediate and/or severe financial loss threats. This may include prioritizing historical text documents and/or prioritizing staffing and capacity constraints.

In certain embodiments, historical text documents classified as high priority are utilized by one or more threat detection and response programs such as Extended Detection and Response (XDR). XDR is used to collect and/or correlate data across various network points (e.g., email, endpoints, servers, cloud workloads, networks, etc.) to provide visibility and context into advanced threats. XDR may use high priority historical text documents to analyze, prioritize, and/or remediate threat, which may reduce and/or prevent data loss and security breaches.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Embodiments of this disclosure generate attack tactic probabilities for historical text documents. In certain embodiments, a security tool searches for attack tactics within historical text documents associated with data breaches using a machine learning algorithm. The security tool generates a probability for each attack tactic identified in each historical document. The probability indicates the likelihood that the associated attack tactic exists within the document, which assists security operations teams in sifting through the noise to focus on the historical text documents that pose immediate and/or severe financial threats.

Figure 1:
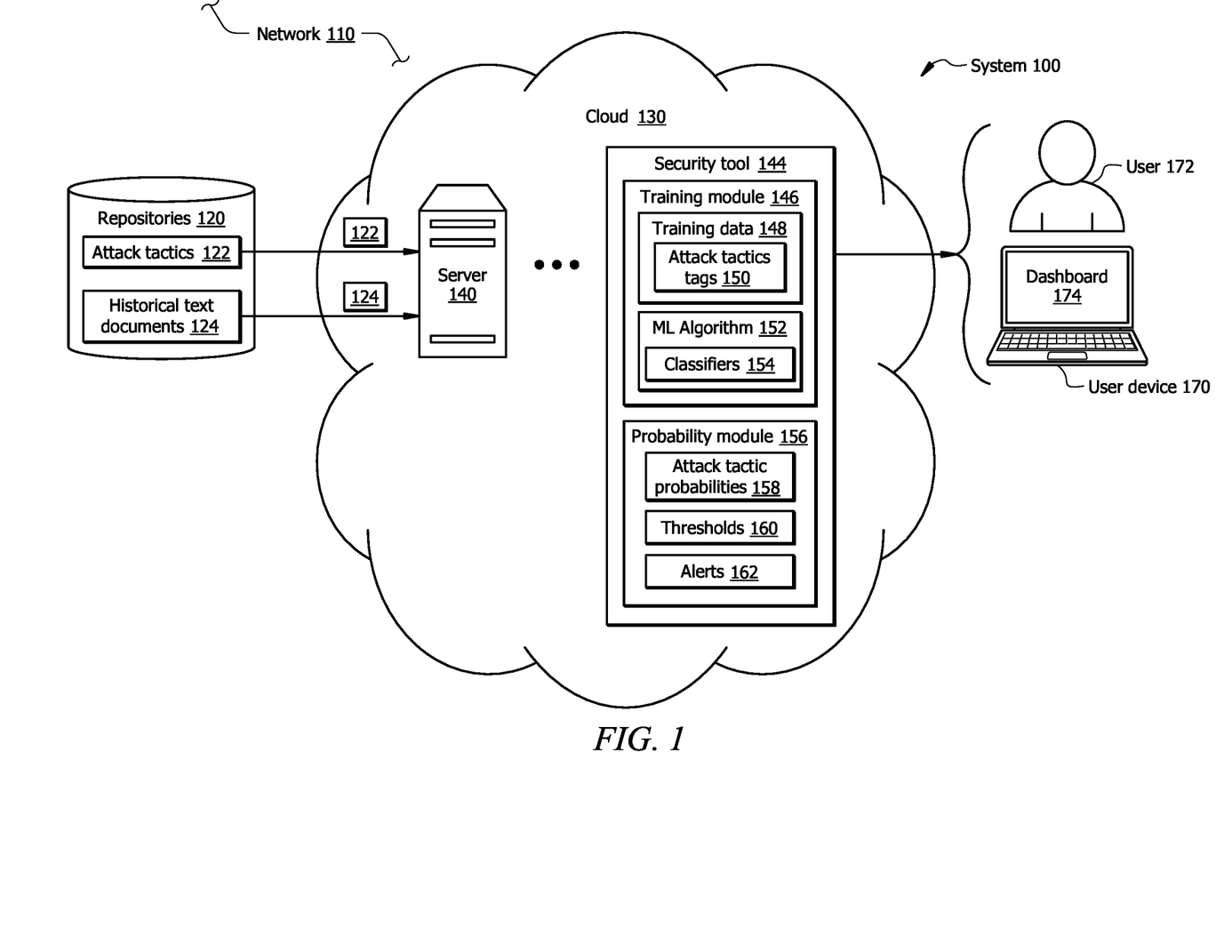
FIG. 1 illustrates an example system for generating attack tactic probabilities for historical text documents.

FIG. 1 illustrates an example system 100 for generating attack tactic probabilities for historical text documents. System 100 or portions thereof may be associated with an entity, which may include any entity, such as a business, company, or enterprise, that generates attack tactic probabilities for historical text documents. In certain embodiments, the entity may be a service provider that provides security services. The components of system 100 may include any suitable combination of hardware, firmware, and software. For example, the components of system 100 may use one or more elements of the computer system of FIG. 3. In the illustrated embodiment of FIG. 1, system 100 includes a network 110, repositories 120, attack tactics 122, historical text documents 124, a cloud 130, a server 140, a security tool 144, a training module 146, training data 148, attack tactic tags 150, machine learning algorithms 152, classifiers 154, a probability module 156, attack tactic probabilities 158, thresholds 160, alerts 162, a user device 170, a user 172, and a dashboard 174.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined wide area network (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3 G/4 G/5 G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network. Nodes may include virtual and/or physical nodes. In certain embodiments, nodes include one or more virtual machines, hardware devices, bare metal servers, and the like. In some embodiments, nodes may include data communications equipment such as computers, routers, servers, printers, workstations, switches, bridges, modems, hubs, and the like. Nodes may use static and/or dynamic routing to send data to and/or receive data to other nodes of system 100.

Repositories 120 are central locations that store and/or manage data. Repositories 120 may include one or more digital repositories, online repositories, open access repositories, databases, subject-based repositories, Git repositories, a combination thereof, and the like. Repositories 120 may be stored on one or more file systems, hosted on computer clusters, hosted in cloud storage, etc. Repositories 120 may be public or private. Public repositories 120 are accessible to all Internet users, whereas private repositories 120 are accessible to those explicitly granted access. In the illustrated embodiment of FIG. 1, repositories 120 store attack tactics 122 and historical text documents 124.

Attack tactics 122 are adversary tactics, techniques, and/or procedures that cyber threat actors use to plan and/or execute cyberattacks on business infrastructures. In some embodiments, attack tactics 122 are stored in a globally accessible knowledge base (e.g., the MITRE Adversarial Tactics, Techniques, and Common Knowledge (ATT&CK) database). Tactics represent the reasons adversaries perform specific actions. Tactics may be associated with one or more of the following: a reconnaissance tactic (e.g., a port scan); a resource development tactic; an initial access tactic (e.g., phishing); an execution tactic (e.g., native API); a persistence tactic; a privilege escalation tactic; a defense evasion tactic; a credential access tactic (e.g., unsecured credentials); a discovery tactic (e.g., network sniffing); a lateral movement tactic; a collection tactic; a command-and-control tactic (e.g., web service); an exfiltration tactic; an impact tactic, and the like.

Techniques represent tactical goals received by adversaries for performing specific actions. Attack tactics 122 may include techniques such as active scanning, phishing for information, establishing accounts, interacting with native OS application programming interfaces (APIs) to execute behaviors, forcing authentication, hijacking execution flows, obtaining, developing, and/or staging capabilities, deploying containers, and the like. In certain embodiments, tactics may include one or more techniques. For example, a reconnaissance tactic may include techniques that involve adversaries actively and/or passively gathering information (e.g., details of the victim's organization) that can be used to support targeting. As another example, a resource development tactic may include techniques that involve adversaries purchasing, creating, and/or compromising resources (e.g., accounts) that can be used to support targeting. As still another example, an initial access tactic may include techniques (e.g., targeted spear phishing) that use entry vectors to gain access to a company's infrastructure.

Historical text documents 124 represent any documents that include information related to breach events. Historical text documents 124 may include a data breach news article, a cyber incident document reported to a federal agency (e.g., Federal Bureau Investigation (FBI), Department of Homeland Security, United States Secret Service (USSS or Secret Service), the Federal Trade Commission (FTC), etc.), a cyber incident document reported to a state agency (e.g., an attorney general), a cyber incident document reported to a local agency (e.g., a district attorney), an industry data breach report (Verizon's Data Breach Investigations Report (DBIR)), a security incident publicly reported to the Vocabulary for Event Recording and Incident Sharing (VERIS), and the like.

Historical text documents 124 may be associated with one or more private sources and/or publicly available sources. For example, historical text documents 124 may be collected by a private organization (e.g., a business or entity). As another example, historical text documents 124 may be collected by publicly available sources such as the VERIS repository or the Advisen database. Historical text documents 124 may be stored in one or more public and/or private repositories 120. For example, historical text documents 124 may be retrieved by accessing a web server repository 120 via the Internet. As another example, historical text documents 124 may be retrieved from a private database of a business. The business's private database may include historical text documents 124 that directly or indirectly led to a financial loss of the business.

In certain embodiments, historical text documents 124 are associated with one or more incidents. Incidents are intrusion events that could potentially lead to a financial loss of a business associated with infrastructure. Historical text documents 124 may include incident tracking data, victim demographic data, incident description data, incident discovery data, incident response data, incident impact assessment data, and the like. Historical text documents 124 may identify the actor behind a particular incident (e.g., an external, internal, or partner actor), the method(s) used by the actor (e.g., malware, hacking, social, misuse, physical, error, environmental, etc.), information about affected assets (e.g., ownership, management, hosting, accessibility, cloud, etc.), information related to how assets were affected (confidentiality, possession, integrity, authenticity, availability, utility, etc.), and the like.

Historical text documents 124 provide a historical view of cyber loss events. Historical text documents 124 may include one or more of the following characteristics: a case type, a case status, an affected count, an accident date, a source of the loss, a type of loss, an actor, a loss amount, a company size, a company type, a number of employees, an industry code, a geography, etc. In certain embodiments, historical text documents 124 are associated with one or more of the following types of cyber risks: breach data, insurance data, cyber extortion, unintentionally disclosed data, physically lost or stolen data, unauthorized data collection, unauthorized contact or disclosure, fraudulent use/account access, network/website disruption, phishing, spoofing, social engineering, skimming, physical tampering, information technology (IT) configuration/implementation errors, IT processing errors, and the like. In certain embodiments, attack tactics 122 and historical text documents 124 are communicated to cloud 130.

Cloud 130 of system 100 refers to servers accessed via the Internet. Cloud 130 may be a private cloud, a public cloud, or a hybrid cloud. Cloud 130 may be associated with one or more of the following cloud computing service models: Software-as-a-Service (SaaS), Platform-as-a-Service (PaaS), Infrastructure-as-a-Service (IaaS), Function-as-a-Service (FaaS), etc. In the illustrated embodiment of FIG. 1, server 140 of system 100 is hosted in cloud 130. Server 140 may be physically located in a data center. Server 140 includes software and hardware and has computing and storage capabilities. In the illustrated embodiment of FIG. 1, sever 142 hosts security tool 144.

Security tool 144 of system 100 is a software program used by server 140 to detect attack tactics 122 in historical text documents 124. In certain embodiments, security tool 144 interoperates with other network components (e.g., repositories 120, agents, endpoints, clouds, security products, etc.) to detect attack tactics 122 in historical text documents 124. Security tool 144 may receive one or more historical text documents 124 from one or more repositories 120. For example, security tool 144 may scour the Internet for data breach news articles, cyber incident documents reported to local, state, and/or federal agencies, industry data breach reports, and the like. As another example, security tool 144 may receive one or more historical text documents 124 from a business. In the illustrated embodiment of FIG. 1, security tool 144 includes a training module 146 and a probability module 156.

Training module 146 of system 100 is an application that trains one or more models to detect attack tactics 122 using training data 148. Training data 148 is any data that has been assigned one or more attack tactic tags 150. In certain embodiments, training data 148 includes historical text documents 124 that have been assigned one or more attack tactic tags 150. Attack tactic tags 150 are non-hierarchical keywords and/or terms that describe attack tactics 122. For example, attack tactic tags 150 may describe a reconnaissance tactic, a resource development tactic, an initial access tactic, a phishing technique (e.g., a targeted spear phishing technique), an active scanning technique, or any other suitable attack tactic 122. Attack tactic tags 150 may be manually assigned to training data 148. For example, an SOC team may analyze a predetermined number of historical text documents 124, determine which attack tactics 122 are included in each historical text document 124, and label each historical text document 124 of training data 148 with one or more appropriate attack tactic tags 150.

In certain embodiments, training module 146 uses one or more machine learning approaches to train the models. Machine learning approaches use machine learning algorithms 152 to analyze data, learn from the data, and make informed decisions based on the learned information. Machine learning approaches may include one or more of the following techniques: natural language processing (NLP), text classification (a machine learning technique that assigns a set of predefined categories to open-ended text), text mining, lexical similarity, and the like. Certain machine learning approaches include deep learning approaches. Deep learning approaches may learn unsupervised data that is unstructured or unlabeled. Deep learning approaches may utilize Convolutional Neural Networks (CNN), Recurrent Neural Networks (RNN), and the like.

In certain embodiments, training module 146 trains one or more models using classifiers 154. Classifiers 154 are algorithms that categorize data into sets of classes. Classifiers 154 may include supervised machine learning classifiers, semi-supervised machine learning classifiers, and/or or unsupervised machine learning classifiers. For example, supervised classifiers 154 may learn to classify data by using training data 148 labeled with attack tactic tags 150. Training module 146 may use classifiers 154 to train the one or more models to detect attack tactics 122. For example, training module 146 may train one or more models to detect a reconnaissance tactic, a resource development tactic, an initial access tactic, a phishing technique (e.g., a targeted spear phishing technique), an active scanning technique, or any other suitable attack tactic 122. The amount and variety of training data 148 utilized by training module 146 may depend on the desired accuracy, the number of classifiers 154, the availability of training data 148 for each classifier 154, and the like.

Probability module 156 is a module that detects attack tactics 122 within historical text documents 124 and/or generates attack tactic probabilities 158 for the detected attack tactics 122. In certain embodiments, probability module 156 detects attack tactics 122 within historical text documents 124 and/or generates attack tactic probabilities 158 for the detected attack tactics 122 in real-time. For example, probability module 156 may analyze historical text documents 124 as soon as they are received by probability module 156. In certain embodiments, probability module 156 detects attack tactics 122 within historical text documents 124 by searching for words associated with attack tactics 122. For example, for an active scanning technique, probability module 156 may search for words such as "active," "scan," and "scanning," whereas for a vulnerability scanning technique, probability module 156 may search for words such as "vulnerability," "vulnerabilities," "scan," and "scanning." As another example, for a resource development tactic, probability module 156 may search for words such as "purchase," "compromise," "steal," "resources," and "infrastructure."

In certain embodiments, probability module 156 detects attack tactics 122 within historical text documents 124 by using lexical similarity. In some embodiments, probability module 156 detects attack tactics 122 within historical text documents 124 by analyzing a predetermined number of words that appear before and/or after an identified word associated with each attack tactic 122. In certain embodiments, probability module 156 detects attack tactics 122 within historical text documents 124 by searching for a number of times a word (e.g., "active" or "scanning") associated with attack tactic 122 (e.g., an active scanning technique) appears in historical text document 124.

Probability module 156 may use classifiers 154 to detect attack tactics 122 within historical text documents 124. For example, probability module 156 may use classifiers 154 to detect one or more reconnaissance tactics, phishing techniques, resource development tactics, compromise accounts techniques, execution tactics, defense evasion tactics, process injection techniques, a combination thereof, and the like. Security tool 144 may generate classifiers 154 for each attack tactic 122 (e.g., for each individual tactic and/or for each individual technique), for one or more combinations of attack tactics 122 (e.g., a reconnaissance tactic and its associated techniques, the techniques associated with the reconnaissance tactic, etc.), and the like.

In certain embodiments, after detecting attack tactics 122 within historical text documents 124, probability module 156 generates attack tactic probabilities 158 for each detected attack tactic 122. Each attack tactic probability 158 represents a likelihood that associated attack tactic 122 exists within historical text document 124. In certain embodiments, probability module 156 generates attack tactic probabilities 158 based on a number of words associated with attack tactic 122 that are detected in historical text document 124, a number of times a word associated with attack tactic 122 appears in historical text document 124, an analysis of a predetermined number of words that appear before an identified word associated with attack tactic 122, an analysis of a predetermined number of words that appear after an identified word associated with attack tactic 122, and the like.

In certain embodiments, attack tactic probabilities 158 range from 0 to 1 such that attack tactic probability 158 of 0 (0 percent) indicates no probability that associated attack tactic 122 exists within historical text document 124 and attack tactic probability 158 of 1 (100 percent) indicates a maximum probability that associated attack tactic 122 exists within historical text document 124. In certain embodiments, probability module 156 categorizes each historical text document 124 based on one or more associated attack tactic probabilities 158.

In certain embodiments, probability module 156 compares one or more attack tactic probabilities 158 to a predetermined threshold 160. Predetermined threshold 160 is a measure of confidence in training module 146. For example, predetermined threshold 160 of 0.6 may indicate a 60 percent confidence in machine learning algorithms 152 and/or classifiers 154. As another example, predetermined threshold 160 of 0.8 may indicate an 80 percent confidence in machine learning algorithms 152 and/or classifiers 154.

In certain embodiments, probability module 156 determines whether one or more attack tactic probabilities 158 exceed predetermined threshold 160. For example, attack tactic probabilities 158 (e.g., 0.55) having a value equal to or below predetermined threshold 160 (e.g., 0.60) may indicate that associated attack tactic 122 does not exist within historical text document 124. As another example, attack tactic probabilities 158 (e.g., 0.90) having a value above predetermined threshold 160 (e.g., 0.60) may indicate that associated attack tactic 122 exists within historical text document 124.

In certain embodiments, security tool 144 may categorize historical text documents 124 based on or more factors. The factors may be associated with a number of attack tactics 122 detected within each historical text document 124, attack tactic probabilities 158 associated with each historical text document 124, a monetary loss associated with each historical text document 124, and the like.

In some embodiments, thresholds 160 are used to prioritize historical text documents 124. For example, security tool 144 may prioritize historical text documents 124 with attack tactic probabilities 158 equal to or greater than threshold 160 (e.g., 0.60) over historical text documents 124 with attack tactic probabilities 158 lower than threshold 160. As another example, security tool 144 may prioritize historical text documents 124 having a number of detected attack tactics 122 greater than threshold 160 (e.g., five attack tactics 122) over historical text documents 124 having a number of detected attack tactics 122 lower than threshold 160.

Probability module 156 may generate one or more alerts 162. Alerts 162 are notifications based on configured conditions. In certain embodiments, alerts 162 notify user 172 which historical text documents 124 require further attention. For example, alerts 162 may notify user 172 which historical text documents 124 have attack tactic probabilities 158 equal to or greater than threshold 160. As another example, alerts 162 may notify user 172 which historical text documents 124 have a number of detected attack tactics 122 greater than threshold 160.

Alerts 162 may generate one or more aural tones, aural phrases, visual representations (e.g., graphs, charts, tables, lists, or any other suitable format) to notify user 172 of any issues. In some embodiments, alerts 162 provide an overall view of one or more historical text documents 124 and associated attack tactics 122 and/or attack tactic probabilities 158 to allow users 172 to quickly determine which historical text documents 124 require immediate attention. In certain embodiments, alerts 162 generate one or more reports that provide visual representations of information. For example, alerts 162 may generate one or more reports that identify historical text document 124, list the name of the organization susceptible to the data breach, describe the data breach (e.g., a date of occurrence, actors involved, affected assets, a financial loss associated with the data breach, etc.), a list of attack tactics 122 identified in historical text document 124, associated attack tactic probabilities 158, a number of times each attack tactic 122 was identified in historical text document 124, and the like. In certain embodiments, security tool 144 generates conditions that use thresholds 160 to trigger alerts 162.

User device 170 of system 100 includes any user equipment that can receive, create, process, store, and/or communicate information. User device 170 may include one or more workstations, desktop computers, laptop computers, mobile phones (e.g., smartphones), tablets, personal digital assistants (PDAs), wearable devices, and the like. In certain embodiments, user device 170 includes a liquid crystal display (LCD), an organic light-emitting diode (OLED) flat screen interface, digital buttons, a digital keyboard, physical buttons, a physical keyboard, one or more touch screen components, a graphical user interface (GUI), and/or the like. User device 170 may be located in any suitable location to receive and communicate information to user 172 of system 100.

User 172 of system 100 is a person or group of persons who utilizes user device 170 of system 100. User 172 may be associated with one or more accounts. User 172 may be a local user, a remote user, an administrator, a customer, a company, a combination thereof, and the like. User 172 may be associated with a username, a password, a user profile, etc. User 172 of user device 170 is a security operations analyst, a financial analyst, etc.

Dashboard 174 of system 100 allows user 172 to visualize any issues associated with historical text documents 124. In certain embodiments, dashboard 174 provides an overall view of one or more historical text documents 124 and associated attack tactics 122 and/or attack tactic probabilities 158 that allows user 172 to determine which historical text documents 124 require immediate attention. Dashboard 174 may display one or more graphs, charts, tables, lists, or any other suitable format to represent the incident-related information. In certain embodiments, dashboard 174 provides a visual representation of one or more historical text documents 124, attack tactics 122, attack tactic probabilities 158, and the like to user 172.

In operation, server 140 receives attack tactics 122 and historical text documents 124 from repositories 120. Each historical text document 124 is associated with a data breach event (e.g., a data breach news article, a cyber incident document reported to a local, state, or federal agency, an industry data breach report, etc.). Training module 146 trains machine learning algorithms 152 (e.g., classifiers 154) to detect attack tactics 122 within historical text documents 124 using training data 148 (e.g., historical text documents 124) previously labeled with attack tactic tags 150. Once trained, training module 146 communicates machine learning algorithms 152 (e.g., classifiers 154) to probability module 156. Probability module 156 of security tool 144 searches for a financial loss value and one or more attack tactics 122 within historical text document 124 using machine learning algorithms 152 (e.g., classifiers 154). Probability module 156 determines a financial loss (e.g., $1.2 million) associated with historical text document 124. Probability module 156 detects attack tactics 122 (e.g., a reconnaissance tactic and a targeted spear phishing technique) within historical text document 124 and generates attack tactic probabilities 158 (e.g., 0.83 and 0.92, respectively) for the detected attack tactics 122. Each attack tactic probability 158 indicates the probability that associated attack tactic 122 exists within historical text document 124. Probability module 156 compares the financial loss (e.g., $1.2 million) and attack tactic probabilities 158 (e.g., 0.83 and 0.92) to predetermined thresholds 160 (e.g., $1.0 million and 0.80, respectively), determines that the financial loss and attack tactic probabilities 158 exceed their respective thresholds 160, and categorizes historical text document 124 as high priority based on this determination. As such, system 100 assists security operations teams in sifting through the noise to focus on historical text documents 124 that pose immediate and/or severe financial threats.

Although FIG. 1 illustrates a particular number of networks 110, repositories 120, attack tactics 122, historical text documents 124, clouds 130, servers 140, security tools 144, training modules 146, training data 148, attack tactic tags 150, machine learning algorithms 152, classifiers 154, probability modules 156, attack tactic probabilities 158, thresholds 160, alerts 162, user devices 170, users 172, and dashboards 174, this disclosure contemplates any suitable number of networks 110, repositories 120, attack tactics 122, historical text documents 124, clouds 130, servers 140, security tools 144, training modules 146, training data 148, attack tactic tags 150, machine learning algorithms 152, classifiers 154, probability modules 156, attack tactic probabilities 158, thresholds 160, alerts 162, user devices 170, users 172, and dashboards 174.

Although FIG. 1 illustrates a particular arrangement of network 110, repositories 120, attack tactics 122, historical text documents 124, cloud 130, server 140, security tool 144, training module 146, training data 148, attack tactic tags 150, machine learning algorithms 152, classifiers 154, probability module 156, attack tactic probabilities 158, thresholds 160, alerts 162, user device 170, user 172, and dashboard 174, this disclosure contemplates any suitable arrangement of network 110, repositories 120, attack tactics 122, historical text documents 124, cloud 130, server 140, security tool 144, training module 146, training data 148, attack tactic tags 150, machine learning algorithms 152, classifiers 154, probability module 156, attack tactic probabilities 158, thresholds 160, alerts 162, user device 170, user 172, and dashboard 174. For example, repositories 120 may be located in cloud 130.

Furthermore, although FIG. 1 describes and illustrates particular components, devices, or systems carrying out particular actions, this disclosure contemplates any suitable combination of any suitable components, devices, or systems carrying out any suitable actions.

Figure 2:
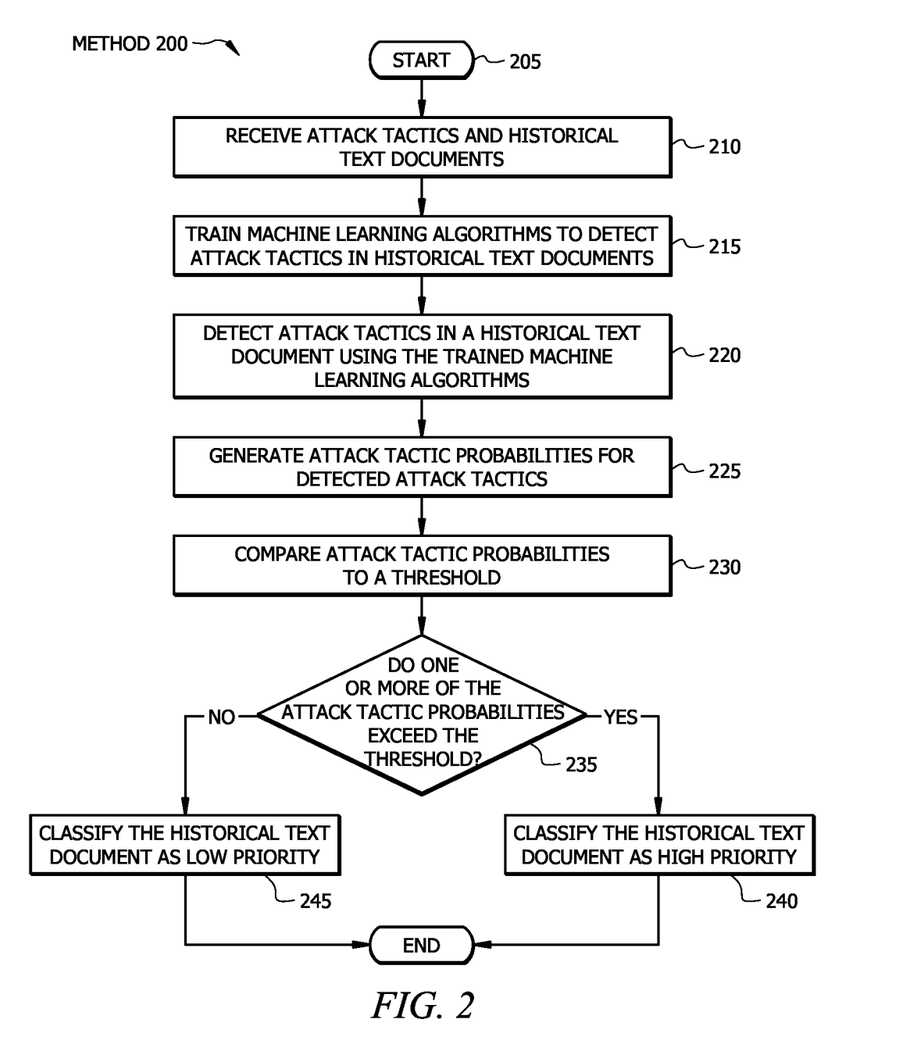
FIG. 2 illustrates an example method for generating attack tactic probabilities for historical text documents.

FIG. 2 illustrates an example method 200 for generating attack tactic probabilities for historical text documents. Method 200 begins at step 205. At step 210 of method 200, a security tool receives attack tactics and historical text documents from one or more repositories. For example, referring to FIG. 1, security tool 144 of system 100 may receive information related to attack tactics 122 (e.g., reconnaissance tactics, credential access tactics, command-and-control tactics, active scanning techniques, phishing techniques, etc.) and historical text documents 124 (e.g., data breach news articles, cyber incident reports, etc.) from repositories 120 (e.g., the MITRE ATT&CK database, a local, state, or federal database, etc.). Method 200 then moves from step 210 to step 215.

At step 215 of method 200, the security tool trains machine learning algorithms to detect attack tactics in historical text documents. For example, referring to FIG. 1, training module 146 of security tool 144 may train machine learning algorithms 152 to detect attack tactics 122 in historical text documents 124 using training data 148 (e.g., historical text documents 124) labeled with attack tactic tags 150. Each attack tactic tag 150 may represent a specific attack tactic 122 (e.g., a reconnaissance tactic or a phishing technique) or a combination of attack tactics 122 (e.g., a reconnaissance tactic or its associated techniques). Method 200 then moves from step 215 to step 220.

At step 220 of method 200, the security tool detects attack tactics in a historical text document using the trained machine learning algorithms. For example, referring to FIG. 1, probability module 156 of security tool 144 may detect attack tactics 122 within historical text document 124 using machine learning algorithms 152 (e.g., classifiers 154). In certain embodiments, the security tool also detects a financial loss value (e.g., $1.2 million) associated with the historical text document. Method 200 then moves from step 220 to step 225.

At step 225 of method 200, the security tool generates attack tactic probabilities for the detected attack tactics. For example, referring to FIG. 1, probability module 156 of security tool 144 may generate attack tactic probabilities 158 (e.g., 0.85 and 0.90) for detected attack tactics 122 (e.g., a reconnaissance tactic and a command-and-control tactic). Each attack tactic probability represents a probability that the associated attack tactic exists within the historical text document. Method 200 then moves from step 225 to step 230.

At step 230 of method 200, the security tool compares the attack tactic probabilities to a predetermined threshold. For example, referring to FIG. 1, probability module 156 of security tool 144 may compare attack tactic probabilities 158 (e.g., 0.85 and 0.90) to predetermined threshold 160 (e.g., 0.80). The predetermined threshold is a measure of confidence in the training module. Method 200 then moves from step 230 to step 235, where the security tool determines whether one or more of the attack tactic probabilities exceed the predetermined threshold. For example, referring to FIG. 1, probability module 156 of security tool 144 may determine whether one or more attack tactic probabilities 158 exceed predetermined threshold 160. In certain embodiments, the probability module determines whether the detected financial loss value (e.g., $1.2 million) associated with the historical text document exceeds a predetermined threshold (e.g., $1.0 million).

If, at step 235, the security tool determines that one or more of the attack tactic probabilities 158 exceed predetermined threshold 160, method 200 moves from step 235 to step 240, where the security tool classifies the historical text document as high priority. For example, referring to FIG. 1, if probability module 156 of security tool 144 determines that one or more attack tactic probabilities 158 (e.g., 0.85 and 0.90) exceed predetermined threshold 160 (e.g., 0.80), probability module 156 classifies historical text document 124 as high priority. In certain embodiments, the security tool may only classify historical text documents having a financial loss value (e.g., $1.2 million) that exceeds the predetermined threshold (e.g., $1.0 million) as high priority.

If, at step 235, the security tool determines that one or more of the attack tactic probabilities 158 do not exceed predetermined threshold 160, method 200 move from step 235 to step 245, where the security tool classifies the historical text document as low priority. For example, referring to FIG. 1, if probability module 156 of security tool 144 determines that attack tactic probabilities 158 (e.g., 0.60 and 0.70) do not exceed predetermined threshold 160 (e.g., 0.80), probability module 156 classifies historical text document 124 as low priority. Method 200 then moves from steps 240 and 245 to step 250, where method 200 ends. As such, method 200 assists security operations teams in sifting through the noise to focus on historical text documents that pose immediate and/or severe financial threats.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example method 200 for generating attack tactic probabilities for historical text documents including the particular steps of the method of FIG. 2, this disclosure contemplates any suitable method for generating attack tactic probabilities for historical text documents, which may include all, some, or none of the steps of the method of FIG. 2, where appropriate. For example, in addition to or in lieu of classifying the historical text document as low priority at step 245, the security tool may label the historical text document with the appropriate attack tactic tags. As another example, in addition to or in lieu of classifying the historical text document as high priority at step 240, the security tool may not label the historical text document with attack tactic tags.

Although FIG. 2 describes and illustrates particular components, devices, or systems carrying out particular actions, this disclosure contemplates any suitable combination of any suitable components, devices, or systems carrying out any suitable actions.

Figure 3:
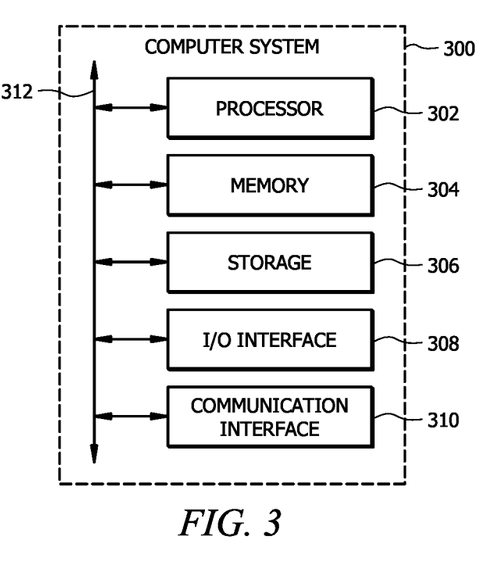
FIG. 3 illustrates an example computer system that may be used by the systems and methods described herein.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network component comprising one or more processors and one or more computer-readable non-transitory storage media coupled to the one or more processors and including instructions that, when executed by the one or more processors, cause the network component to perform operations comprising:
   receiving a historical text document, wherein the historical text document is associated with a breach event;
   searching for an attack tactic within the historical text document using a machine learning algorithm;
   training the machine learning algorithm to detect the attack tactic using a plurality of historical text documents previously tagged with the attack tactic, wherein the machine learning algorithm uses natural language processing (NLP) to search for the attack tactic with the historical text document;
   generating a probability that the attack tactic exists within the historical text document;
   comparing the probability to a predetermined probability threshold, wherein the predetermined probability threshold represents a level of confidence in the machine learning algorithm; and
   categorizing the historical text document based on the probability.

2. The network component of claim 1, wherein the historical text document associated with the breach event is one of the following:
- a data breach news article;
- a cyber incident document reported to a federal agency;
- a cyber incident document reported to a state agency; or
- an industry data breach report.

3. The network component of claim 1, the operations further comprising:
- searching for a financial loss value within the historical text document using a machine learning algorithm, wherein the financial loss value is associated with the breach event; and
- categorizing the historical text document based on the financial loss value.

4. The network component of claim 1, wherein searching for the attack tactic within the historical text document using the machine learning algorithm comprises one or more of the following:
- searching for words associated with the attack tactic;
- analyzing a predetermined number of words that appear before an identified word associated with the attack tactic;
- analyzing a predetermined number of words that appear after an identified word associated with the attack tactic; and
- searching for a number of times a word associated with the attack tactic appears in the historical text document.

5. The network component of claim 1, wherein generating the probability that the attack tactic exists within the historical text document is based on one or more of the following:
- a number of words associated with the attack tactic that are detected in the historical text document;
- a number of times a word associated with the attack tactic appears in the historical text document;
- an analysis of a predetermined number of words that appear before an identified word associated with the attack tactic; and
- an analysis of a predetermined number of words that appear after an identified word associated with the attack tactic.

6. A method, comprising:
- receiving a historical text document, wherein the historical text document is associated with a breach event;
- searching for an attack tactic within the historical text document using a machine learning algorithm;
- training the machine learning algorithm to detect the attack tactic using a plurality of historical text documents previously tagged with the attack tactic, wherein the machine learning algorithm uses natural language processing (NLP) to search for the attack tactic with the historical text document;
- generating a probability that the attack tactic exists within the historical text document;
- comparing the probability to a predetermined probability threshold, wherein the predetermined probability threshold represents a level of confidence in the machine learning algorithm; and
- categorizing the historical text document based on the probability.

7. The method of claim 6, wherein the historical text document associated with the breach event is one of the following:
- a data breach news article;
- a cyber incident document reported to a federal agency;
- a cyber incident document reported to a state agency; or
- an industry data breach report.

8. The method of claim 6, further comprising:
- searching for a financial loss value within the historical text document using a machine learning algorithm, wherein the financial loss value is associated with the breach event; and
- categorizing the historical text document based on the financial loss value.

9. The method of claim 6, wherein searching for the attack tactic within the historical text document using the machine learning algorithm comprises one or more of the following:
- searching for words associated with the attack tactic;
- analyzing a predetermined number of words that appear before an identified word associated with the attack tactic;
- analyzing a predetermined number of words that appear after an identified word associated with the attack tactic; and
- searching for a number of times a word associated with the attack tactic appears in the historical text document.

10. The method of claim 6, wherein generating the probability that the attack tactic exists within the historical text document is based on one or more of the following:
- a number of words associated with the attack tactic that are detected in the historical text document;
- a number of times a word associated with the attack tactic appears in the historical text document;
- an analysis of a predetermined number of words that appear before an identified word associated with the attack tactic; and
- an analysis of a predetermined number of words that appear after an identified word associated with the attack tactic.

11. One or more computer-readable non-transitory storage media embodying instructions that, when executed by a processor, cause the processor to perform operations comprising:
- receiving a historical text document, wherein the historical text document is associated with a breach event;
- searching for an attack tactic within the historical text document using a machine learning algorithm;
- training the machine learning algorithm to detect the attack tactic using a plurality of historical text documents previously tagged with the attack tactic, wherein the machine learning algorithm uses natural language processing (NLP) to search for the attack tactic with the historical text document;
- generating a probability that the attack tactic exists within the historical text document;
- comparing the probability to a predetermined probability threshold, wherein the predetermined probability threshold represents a level of confidence in the machine learning algorithm; and
- categorizing the historical text document based on the probability.

12. The one or more computer-readable non-transitory storage media of claim 11, wherein the historical text document associated with the breach event is one of the following:
- a data breach news article;
- a cyber incident document reported to a federal agency;
- a cyber incident document reported to a state agency; or
- an industry data breach report.

13. The one or more computer-readable non-transitory storage media of claim 11, the operations further comprising:

searching for a financial loss value within the historical text document using a machine learning algorithm, wherein the financial loss value is associated with the breach event; and categorizing the historical text document based on the financial loss value.

14. The one or more computer-readable non-transitory storage media of claim 11, wherein searching for the attack tactic within the historical text document using the machine learning algorithm comprises one or more of the following:

searching for words associated with the attack tactic;

analyzing a predetermined number of words that appear before an identified word associated with the attack tactic;

analyzing a predetermined number of words that appear after an identified word associated with the attack tactic; and searching for a number of times a word associated with the attack tactic appears in the historical text document.

* * * * *